(12) United States Patent
Egawa et al.

(10) Patent No.: US 7,149,237 B2
(45) Date of Patent: Dec. 12, 2006

(54) LASER OSCILLATOR

(75) Inventors: Akira Egawa, Gotenba (JP); Minoru Ando, Yamanashi (JP); Takeshi Watanabe, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 98 days.

(21) Appl. No.: 10/372,168

(22) Filed: Feb. 25, 2003

(65) Prior Publication Data
US 2003/0179798 A1   Sep. 25, 2003

(30) Foreign Application Priority Data
Mar. 25, 2002   (JP)   ............... 2002-083693

(51) Int. Cl.
*H01S 3/22* (2006.01)
(52) U.S. Cl. ...................................... 372/59
(58) Field of Classification Search ............... 372/55, 372/58, 59
See application file for complete search history.

(56) References Cited

U.S. PATENT DOCUMENTS

| | | | | |
|---|---|---|---|---|
| 3,789,320 A | * | 1/1974 | Hepburn ............... | 372/58 |
| 4,651,324 A | * | 3/1987 | Prein et al. ............ | 372/59 |
| 4,815,092 A | * | 3/1989 | Chartier ............... | 372/59 |
| 4,837,770 A | * | 6/1989 | Koop ................... | 372/59 |
| 4,984,245 A | * | 1/1991 | Karube ................. | 372/59 |
| 5,020,069 A | * | 5/1991 | McNeil et al. ......... | 372/59 |
| 5,856,993 A | * | 1/1999 | Katoh et al. .......... | 372/58 |
| 6,471,929 B1 | * | 10/2002 | Kusunoki et al. ...... | 423/245.3 |
| 6,620,385 B1 | * | 9/2003 | Fujii ................... | 422/186.3 |
| 2001/0028670 A1 | * | 10/2001 | Tamura et al. ......... | 372/55 |

FOREIGN PATENT DOCUMENTS

| | | | | |
|---|---|---|---|---|
| GB | 2083944 | A | * | 3/1982 |
| GB | 2107109 | A | * | 4/1983 |
| JP | 05-102552 | A | * | 4/1993 |
| JP | 2001-284685 | | | 10/2001 |

OTHER PUBLICATIONS

Notice of Grounds for Rejection (Office Action) with English translation.

* cited by examiner

*Primary Examiner*—James Menefee
(74) *Attorney, Agent, or Firm*—Staas & Halsey LLP

(57) ABSTRACT

A laser oscillator capable of preventing contamination of optical components by organic matter such as oil mist. Gas laser medium in an optical resonator constituted by optical components is pumped by an electric discharge generated in an electric discharge tube to produce a laser beam. The gas medium flows at high speed in the electric discharge tube incorporated in a circulating path including a blower. A part of lubrication oil of the blower is evaporated and mixed into the gas medium. Since the optical components are cooled by retaining mechanisms to prevent temperature rise of the components and a gas stagnation occurs between the optical component and the electric discharge tube, the evaporated oil mist tends to be congealed and adhered to a surface of the optical component. A photocatalyst arranged in the vicinity of the optical component effectively decomposes and removes the oil mist.

11 Claims, 4 Drawing Sheets

LASER OSCILLATOR

BACKGROUND OF THE INVENTION

1. Field of the Invention

The present invention relates to a laser oscillator for use in laser machining, medical treatment, illumination, communication, etc. and in particular to a laser oscillator having a function of decomposing organic matter such as oil mist in the oscillator by photocatalysis, to reduce contamination of optical components by the organic matter.

2. Description of Related Art

In general, there exists vaporized organic matter such as oil mist in an ambience around optical components of a laser oscillator for various causes. The vaporized organic matter is congealed and adhered to surfaces of the optical components which are cooled forcedly, and the congealed organic matter absorbs a laser beam to lower an output power of the laser beam and generates heat to deteriorate or distort the optical components to lower quality of the laser beam.

FIG. 4 is a partial cross-section of a gas laser oscillator in the vicinity of an optical component for explaining the above phenomenon in a case of gas laser. In FIG. 4, a reference numeral 2 denotes an electric discharge tube and a reference numeral 4 denotes one of mirrors constituting a resonator, i.e. an output mirror or a rear mirror as an optical component of the laser oscillator. The mirror 4 as the optical component is held by a retaining mechanism 8. The electric discharge tube 2 is arranged between the resonator mirrors, one of which is shown in FIG. 4, and incorporated in a circulating path including a blower. The gas laser medium 7 flows in the electric discharge tube 2 through the circulating path at high speed.

When the gas laser medium is pumped by electric discharge 3 generated in the electric discharge tube 2, stimulated emission light is amplified in the resonator and outputted from the output mirror (one of the resonator mirrors 4) according to known principle. In an operation of the laser oscillator, vaporized organic matter such as oil mist is mixed in ambience, i.e. gas laser medium in this example, of the optical component 4. In general, the optical component 4 is forcedly cooled through the retaining mechanism 8 for preventing distortion of the optical component 4 by heat.

The vaporized organic matter is cooled by the optical component 4 and congealed and adhered to surfaces of the optical component 4. Further, a gas stagnation 13 is caused between the optical component 4 and an inlet/outlet of the gas medium into/from the electric discharge tube 2 in the circulating path, to accelerate the congeal and adhesion of the organic matter on the optical component 4. Therefore, it is necessary to often lean the optical component 4 or change the optical component 4 with a new one to cause increase of running cost.

In Japanese Patent Publication No. 2001-284685A, there is described a laser oscillator in which a photocatalytic layer is arranged at inner walls of a casing of the laser oscillator. This technique relates to suppressing of deterioration of composition of gas laser medium by inorganic matter produced by chemical reaction in a gas laser oscillator. Organic matter such as oil mist contained as minor component in a large mount of gas laser medium circulating at high speed hardly react with the photocatalytic layer, so that the organic matter which contaminates the optical component is not effectively decomposed and removed. Further, since the phtocatalytic layer is arranged remote from the optical component, the phtocatalytic layer is scarcely expected to have a function of cleaning the optical component.

SUMMARY OF THE INVENTION

An object of the present invention is to effectively decompose and remove rare organic matter such as oil mist contained in an ambient gas around an optical component of a laser oscillator so as to prevent contamination and deterioration of the optical component thereby reducing labor for maintenance of the optical component and running cost of the laser oscillator and also reducing deterioration of quality of a laser beam.

A laser oscillator of the present invention comprises: a laser medium to be subjected to laser pumping; a pair of reflecting mirrors arranged to confront with each other with the laser medium positioned therebetween; and photocatalyst arranged in the vicinity of at least one of the reflecting mirrors. The laser medium may be pumped by a light source, a heat source, an electric discharge or a chemical reaction.

Ultraviolet ray generated by the laser pumping can be utilized for exciting the photocatalyst. For effectively utilizing the ultraviolet ray, it is advantageous to arrange the photocatalyst is arranged at a region to which the ultraviolet ray is directly irradiated.

It is preferabe to adopt photocatalyst having a function of decomposing organic matter such as oil mist.

The photocatalyst may be provided as a photocataltic layer formed on at least one of an inner wall and an outer wall of a hollow cylindrical support. A tube made of quartz may be used for supporting the photocatalyst. The photocatalyst may comprise one of $TiO_2$, $ZnO$, $SnO_2$, $SrTiO_3$, $WO_3$, $Bi_2O_3$ and $Fe_2O_3$.

The laser medium may comprise fluid gas and the photocatalyst may be arranged at a region where the fluid gas is stagnated in the oscillator.

According to the present invention, the organic matter such as oil mist contained in an ambiance of the optical component of the laser oscillator is effectively decomposed and removed by photocatalysis of the photocatalyst such as titanium oxide arranged in the vicinity of the optical component, to greatly reduce contamination of the optical component by the organic matter.

The process of decomposition of the organic matter by the photocatalyst with oxidation and decomposition function is considered as follows;

When the ultraviolet ray impinges on the photocatalyst, electron $e^-$ and electron hole $P^+$ are produced by the photoelectric effect and move to a surface of the photocatalyst. The electron $e^-$ deoxidizes oxide around to produce $O_2^-$, $O^-$ and $O_3^-$ as superoxide ion, as shown in the following formulae.

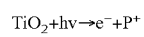
$TiO_2 + h\nu \rightarrow e^- + P^+$

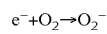
$e^- + O_2 \rightarrow O_2^-$

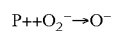
$P^+ + O_2^- \rightarrow O^-$

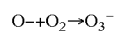
$O^- + O_2 \rightarrow O_3^-$

The above $O_2^-$, $O^-$ and $O_3^-$ are called as active oxygen species having strong oxidizing ability. Thus, the organic molecule $C_mH_n$ (m,n: positive integer) is oxidized to be decomposed into carbon dioxide and water as follows;

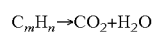
$C_mH_n \rightarrow CO_2 + H_2O$

Thus, the photocatalyst arranged in the vicinity of the optical component, which is excited by ultraviolet ray generated by the laser pumping, decomposes the organic matter such as oil mist contained in the ambient gas in the vicinity of the optical component to reduce contamination of the optical component.

The gas in the ambience of the optical component may be purge gas used in a resonator of a solid-state laser oscillator as well as the gas laser medium used in a gas laser oscillator. The purge gas is also the ambient gas in the vicinity of the optical component and contains the organic matter such as oil mist. In this case, ultraviolet ray contained in pumping light from a pumping lamp is utilized for exciting the photocatalyst.

DETAILED DESCRIPTION OF THE PREFERRED EMBODIMENTS

Figure 1:
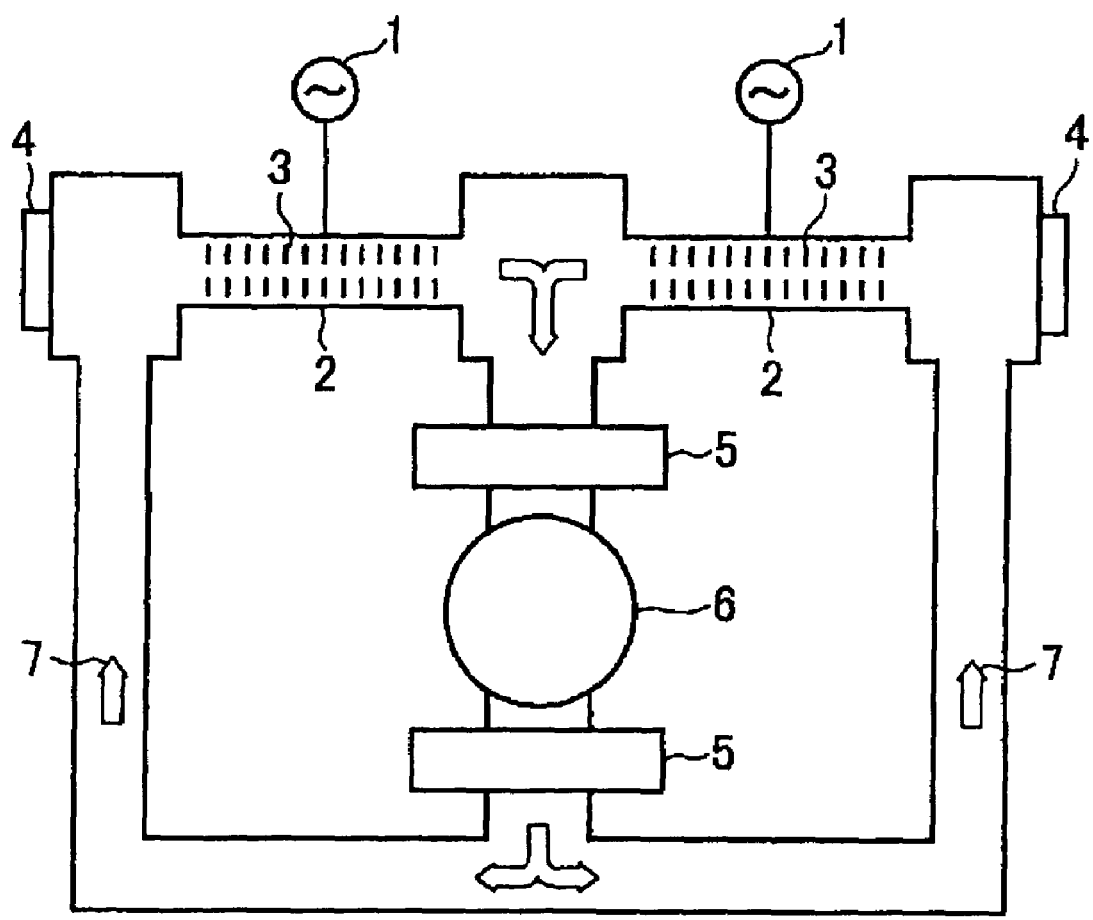
FIG. 1 is a schematic view showing a whole arrangement of a laser oscillator according to an embodiment of the present invention.
Figure 2:
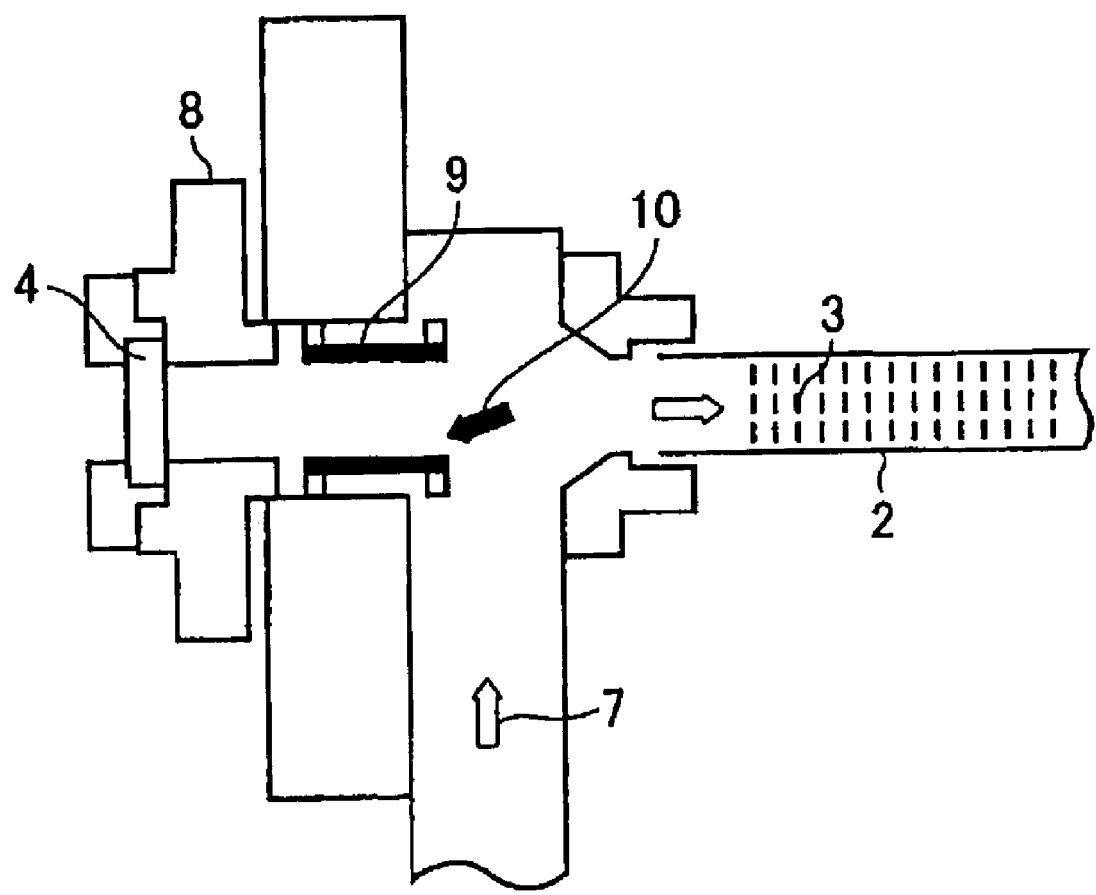
FIG. 2 is a partially cross-sectional schematic view of the laser oscillator shown in FIG. 1 in the vicinity of an optical component.

FIGS. 1 and 2 schematically show a gas laser oscillator using gas laser medium as an example of a laser oscillator according to the present invention. In the following description, the same reference numeral is assigned to an element of the laser oscillator having the same or equivalent function.

In FIG. 1, an RF (radio frequency) alternating current power source 1 is connected with electrodes (not shown) of each electric discharge tube 2. The electric discharge tubes 2 are arranged between resonator mirrors 4 constituting a laser resonator, one of which is an output mirror and the other of which is a rear mirror. As shown in FIG. 2, the resonator mirror 4 as an optical component of the laser oscillator is retained by an optical component retaining mechanism 8. As shown in FIG. 1, the electric discharge tubes 2 are incorporated in a circulating path of gas laser medium 7 including heat exchangers 5 and a blower 6, through which the gas medium 7 flows at high speed. The heat exchangers 5 cools gas medium 7 heated in the electric discharge tubes 2 and the blower blows the gas medium 7 for circulating the gas medium 7 in the circulating path.

When the RF power sources 1 are started to generate electric discharge 3 in the electric discharge tubes 2, the gas laser medium 7 is pumped by the electric discharge 3 and emitted light is resonated by the resonator constituted by the mirrors 4 to generate a laser beam. The gas medium 7 is heated to have a high temperature by the electric discharge 3 and cooled by the heat exchangers 5 provided upstream and downstream of the blower 6 in the circulating path to suppress a temperature rise in the electric discharge tubes 2.

A part of lubrication oil used in the blower 6 evaporates and mixed with the circulating gas medium. Since the optical component 4 held by the retaining mechanism 8 is cooled to suppress temperature rise, the evaporated oil in the vicinity of the mirror 4 is cooled to be congealed and adhered on a surface of the optical component 4. Further, since there is formed a gas stagnation 13 between the optical component 4 and an inlet/outlet of the gas medium into/from the electric discharge tube 2, so that the congeal and adhesion of the organic matter tends to occur.

According to the present invention, as shown in FIG. 2, a photocatalyst 9 is provided in the vicinity of the optical component 4 where the gas stagnation is caused in order to effectively decompose the organic matter such as oil mist. The "vicinity of the optical component 4" may be regarded as a space between the optical component 4 and a region where the electric discharge 3 is generated. An ultraviolet ray 10 contained in light emitted by the electric discharge is advantageously utilized for exciting the photocatalyst 9. The photocatalyst 9 is arranged at a position to which the light by the electric discharge 3 is directly irradiated so that the photocatalyst 9 is excited by the ultraviolet ray 10 to enhance photocatalysis of decomposing the organic matter.

Since the photocatalyst 9 is positioned near the optical component 4, the oil mist abiding in the stagnating region 13 approaches and comes in contact with the photocatalyst 9 at high probability. Thus, the oil mist is effectively decomposed by photocatalytic function of the photocatalyst 9 to lower a density of the oil mist to a low level so that the adhesion of the oil mist to the optical component 4 is suppressed.

Figure 3:
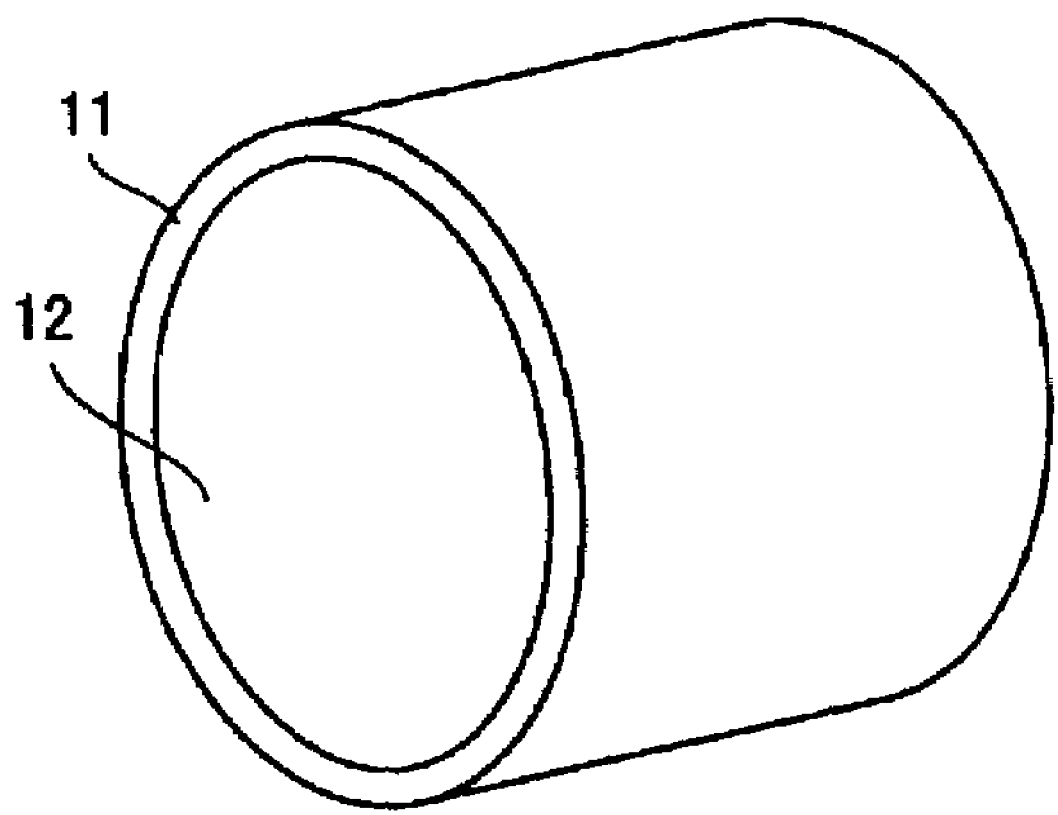
FIG. 3 is a perspective view of a carrier of photocatalyst for use in the laser oscillator shown in FIG. 1.

FIG. 3 shows an example of a support for the photocatalyst 9. In this example, a hollow cylindrical short tube 11 made of quartz or ceramic is used as the support of the photocatalyst. A photocatalytic layer 12 comprising a thin layer of titanium oxide is formed on an inner wall of the short tube 11. The short tube 11 with the photocatalytic layer 12 can be disposed as the photocatalyst 9 at a position as shown in FIG. 2. An inner diameter of the short tube 11 is set larger than a diameter of the laser beam such that the laser beam travels through the hollow cylinder without interference. The photocatalyst layer 12 may be formed only on an outer wall of the cylindrical body without forming on the inner wall, or formed on both of the outer wall and the inner wall, as occasion arises.

The foregoing embodiment is directed to a laser oscillator using gas laser medium. The present invention is not restricted to the gas laser oscillator but is applicable as other type of laser oscillator such as solid-state laser using solid-state laser medium as long as gas ambient exists around the optical component of the laser oscillator and the gas ambient contains organic matter such as oil mist.

For instance, in the case of a lamp-pumping solid-state laser oscillator in which purge gas is circulated for preventing contamination, an arrangement similar to that of the above embodiment can be applied by substituting the purge gas for the gas laser medium. In this case, an ultraviolet ray contained in pumping light emitted from a pumping lamp is utilized for exciting the photo catalyst.

Thus, organic gas generated by heat or pumping light from surfaces of components of the laser oscillator or oil component contained in the purge gas in the other type of laser oscillators is also decomposed and removed in the same manner as described in the above embodiment.

According to the present invention, contamination of an optical component of a laser oscillator is greatly reduced by decomposing organic matter by means of photocatalyst arranged in the vicinity of the optical component, to maintain a stable quality and an output power of a laser beam for a long term. Further, frequency of cleaning and changing the optical component is lowered to reduce labor for maintenance and running cost.

What is claimed is:

1. A laser oscillator comprising:
   a laser medium to be subjected to laser pumping by electric discharge;
   a pair of reflecting mirrors arranged to confront each other with said laser medium positioned therebetween; and
   a photocatalyst arranged at a space between one of said reflecting mirrors and a region where the electric discharge is generated.

2. A laser oscillator according to claim 1, wherein said photocatalyst is excited by an ultraviolet ray generated by the laser pumping.

3. A laser oscillator according to claim 1, wherein said photocatalyst decomposes organic matter.

4. A laser oscillator according to claim 3, wherein said organic matter includes oil mist.

5. A laser oscillator according to claim 1, wherein said photocatalyst is provided as a photocataltic layer formed on at least one of an inner wall and an outer wall of a hollow cylindrical base.

6. A laser oscillator according to claim 1, wherein said photocatalyst comprises one of $TiO_2$, $ZnO$, $SnO_2$, $SrTiO_3$, $WO_3$, $Bi_2O_3$ and $Fe_2O_3$.

7. A laser oscillator according to claim 1, wherein said photocatalyst is supported by a tube made of quartz or ceramic.

8. A laser oscillator according to claim 1, wherein said laser medium comprises fluid gas and said photocatalyst is arranged at a region where the fluid gas is stagnated in the oscillator.

9. A laser oscillator according to claim 1, wherein said photocatalyst is arranged at a region to which the ultraviolet ray is directly irradiated.

10. A laser oscillator comprising:
    an optical component; and
    a photocatalyst arranged at a space between the optical component and a region where electric discharge is generated.

11. A laser oscillator comprising:
    a circular path in which a laser medium circulates;
    a pair of reflecting mirrors along the circular path; and
    a photocatalyst arranged at a space between one at least one of the mirrors and a region where electric discharge is generated.

* * * * *

UNITED STATES PATENT AND TRADEMARK OFFICE
CERTIFICATE OF CORRECTION

PATENT NO. : 7,149,237 B2
APPLICATION NO. : 10/372168
DATED : December 12, 2006
INVENTOR(S) : Akira Egawa et al.

Figure 4:
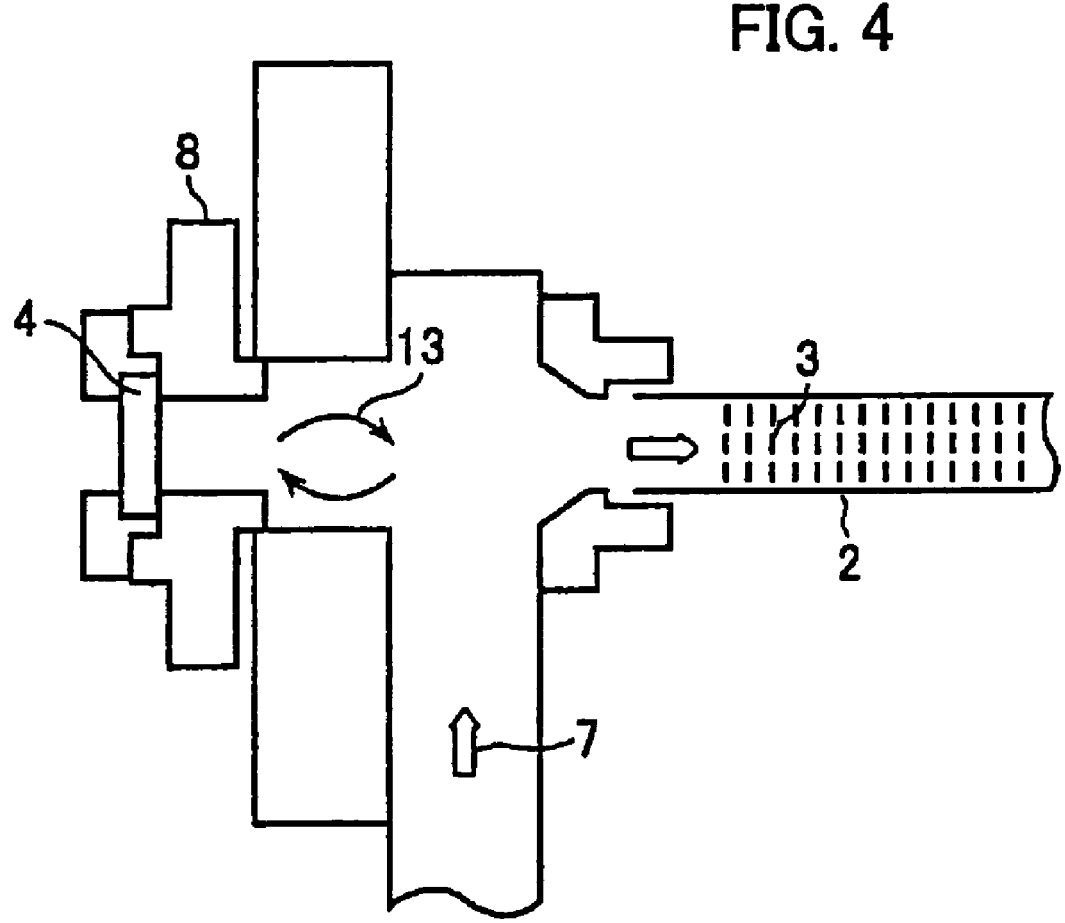
FIG. 4 is a partially cross-sectional schematic view of an conventional laser oscillator in the vicinity of an optical component.

It is certified that error appears in the above-identified patent and that said Letters Patent is hereby corrected as shown below:

In the drawings:
Fig. 4, insert --PRIOR ART-- above "FIG. 4".

Column 1, Line 61, change "mount" to --amount--.

Column 2, Line 23, change "preferabe" to --preferable--.

Column 2, Line 25, change "photocataltic" to --photocatalytic--.

Column 2, Line 55, "P++$O_2^-$→ $O^-$" to --$P^+$+$O_2^-$→ $O^-$--.

Column 2, Line 57, "O-+$O_2$→ $O_3^-$" to --$O^-$+$O_2$→ $O_3^-$ --.

Column 5, Line 18, change "photocataltic" to --photocatalytic--.

Column 5, Line 22, change "TiO2," to --$TiO_2$,--.

Column 5, Line 22, change "SnO2," to --$SnO_2$,--.

Column 5, Line 22, change "SrTiO3," to --$SrTiO_3$--.

Column 5, Line 23, change "WO3," to --$WO_3$--.

Column 5, Line 23, change "Bi203" to --$Bi_2O_3$--.

Column 5, Line 23, change "Fe203." to --$Fe_2O_3$.--

Signed and Sealed this

Third Day of April, 2007

JON W. DUDAS
*Director of the United States Patent and Trademark Office*